(12) United States Patent
Acharya et al.

(10) Patent No.: US 7,985,138 B2
(45) Date of Patent: Jul. 26, 2011

(54) SIP BASED VOIP MULTIPLAYER NETWORK GAMES

(75) Inventors: Arup Acharya, Nanuet, NY (US); Aameek Singh, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 10/780,089

(22) Filed: Feb. 17, 2004

(65) Prior Publication Data

US 2005/0181872 A1 Aug. 18, 2005

(51) Int. Cl.
*A63F 9/24* (2006.01)

(52) U.S. Cl. .......................................................... 463/42

(58) Field of Classification Search ...................... 463/42
See application file for complete search history.

(56) References Cited

U.S. PATENT DOCUMENTS

| | | | |
|---|---|---|---|
| 5,762,552 A | 6/1998 | Vuong et al. | |
| 6,179,713 B1 | 1/2001 | James et al. | |
| 6,466,550 B1 | 10/2002 | Foster et al. | |
| 6,509,925 B1 | 1/2003 | Dermler et al. | |
| 6,567,813 B1 | 5/2003 | Zhu et al. | |
| 6,845,389 B1 | 1/2005 | Sen et al. | |
| 7,006,616 B1 * | 2/2006 | Christofferson et al. | 379/202.01 |
| 2004/0014514 A1 | 1/2004 | Yacenda | |
| 2004/0228291 A1 | 11/2004 | Huslak et al. | |

FOREIGN PATENT DOCUMENTS

| | | |
|---|---|---|
| EP | 1207694 A2 | 5/2002 |
| JP | 2001204973 A | 7/2001 |
| KR | 20020038229 A | 5/2002 |
| KR | 20030039019 A | 5/2003 |
| TW | 424213 | 3/2001 |
| TW | 527825 | 4/2001 |
| WO | 02003645 A2 | 1/2002 |
| WO | 03049459 A1 | 6/2003 |
| WO | 03058518 A2 | 7/2003 |

OTHER PUBLICATIONS

Search Report for corresponding Taiwan Patent Application No. 094103525 filed Feb. 4, 2005.
Supplementary European Search from the European Patent Office, Dated Jul. 19, 2010.
International Search Report as Published as WO2005/079538 in corresponding international application No. PCT/US2005/005550.

* cited by examiner

*Primary Examiner* — Corbett B Coburn
(74) *Attorney, Agent, or Firm* — George Willinghan; August Law, LLC

(57) ABSTRACT

Systems and methods are provided for the close coupling of Session Initiation Protocol (SIP) based Voice over Internet Protocol (VoIP) with multiplayer network games. Game state dependent voice communications are used as another method of player interaction in the game environment. The system uses SIP enhanced game servers and conference servers with audio mixing capabilities, and the game server controls the creation, maintenance and changing of the voice conferences. Participation in a voice conference is determined by the game state features associated with each player including distance and direction to determine how the voices are mixed in a voice conference.

25 Claims, 6 Drawing Sheets

SIP BASED VOIP MULTIPLAYER NETWORK GAMES

FIELD OF THE INVENTION

The present invention is directed to the field of network based computer games. More particularly the present invention is directed to the integration of Voice over Internet Protocol (VoIP) using Session Initiation Protocol (SIP) to enhance network based multiplayer games.

BACKGROUND OF THE INVENTION

Multiplayer network games have become increasing popular. These games are played across a computer network, for example the Internet or World Wide Web, and permit a significant number of geographically dispersed and distant users to participate simultaneously in a single game. Participation in a game requires maintaining a game state for each participant. Since the game environment is dynamic, these games states include the ability of users to join the game, participate and leave the game. In addition, these games provide for interaction among the users within the gaming environment.

Traditionally, these interactions have been limited to pre-defined gaming actions, for example shooting, running, fighting and text messaging. A few network gaming systems have recently attempted to provide an element of voice communication among the game participants. The voice functionality facilitates conversations among the players, but the voice conversations are not game context based. For example, voice communication is used as a messaging mechanism among the players, replacing text messaging. Typically, voice messaging completely falls outside the scope and operation of the game and is user initiated independent of the game. In addition, although VoIP is used to facilitate these conversations, the use of VoIP has been very limited and restricted and fails to exploit the entire potential and functionality of VoIP.

Traditionally, VoIP has been primarily used as a telecommunications alternative to a standard Public Switched Telephone Network (PSTN); however, VoIP technology possesses potential in a wide variety of other applications.

Therefore, the need exists for a system and method for utilizing the full extent of VoIP functionality to enhance the gaming experience among players. The VoIP would be imbedded in and integrated with the game and maintained by the game in conjunction with the game state, eliminating the need for independent and separate user initiation of voice communications. The voice data exchange would not be limited to conversations but would incorporate game based context to enhance the gaming experience.

SUMMARY OF THE INVENTION

The present invention is directed to systems and methods using Voice over Internet Protocol (VoIP) to complement and enhance the experience of participants in multiplayer network based games. VoIP provides the ability to send voice data alongside or in conjunction with other data over the same network.

The present invention utilizes Session Initiation Protocol (SIP) based VoIP to provide game driven, context based voice interaction among participants in a network based gaming environment. For example, in addition to allowing players to talk to each other, to make alliances, to discuss strategy and to coordinate teammates and activities, the present invention provides for the restriction of communication among players having a single shared context, e.g. the same physical location or room within the gaming environment. VoIP can also be used to provide more sophisticated audio mixing to relay information about another player's distance and location with respect to the recipient of the voice communication, e.g. players farther away sound farther away.

In order to achieve this, the present invention utilizes game server controlled conferencing among various sets or groups of players and dynamic switching of players from one conference to another based on the game state. In addition, more sophisticated conferencing mechanisms, for example media mixing that utilizes other game state features like distance of voice-source from the listener, are used to control conference parameters like voice amplitudes.

Each user, in addition to a gaming system such as a computer, also uses a VoIP enabled device capable of receiving and transmitting audio signals. In addition to the visual state of the game that each player receives, the players also receive related audio communications from the game or the other players. For example, players in the same game room or on the same team can talk to each other. When a player changes game rooms, similar to its change of the visual state, the audio also changes seamlessly. The present invention uses the game server to automatically indicate the requirement for such a change and dynamically switch the players without additional player input.

DETAILED DESCRIPTION

Figure 1:
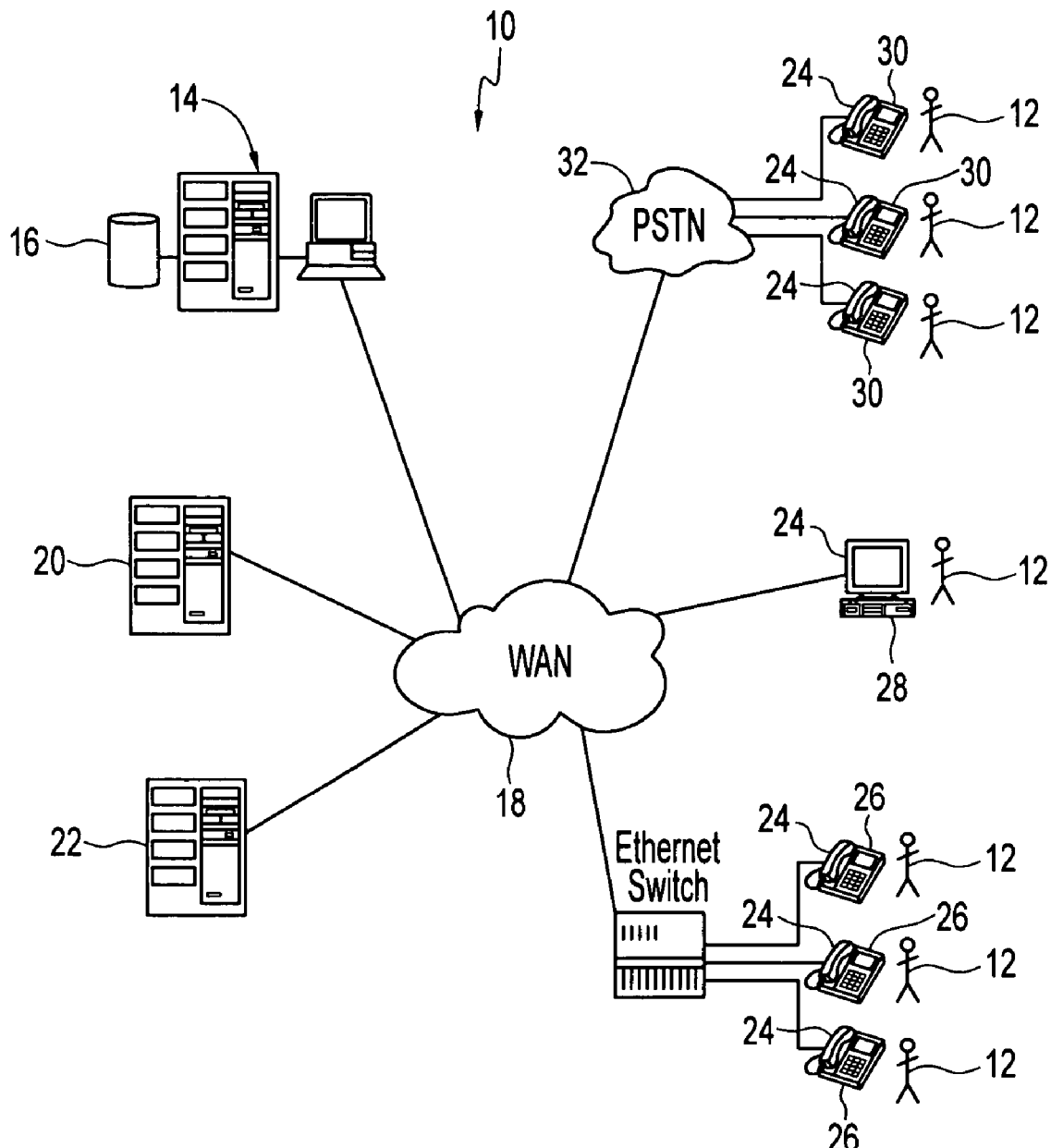
FIG. 1 is a schematic representation of an embodiment of a gaming system in accordance with the present invention.
Figure 2:
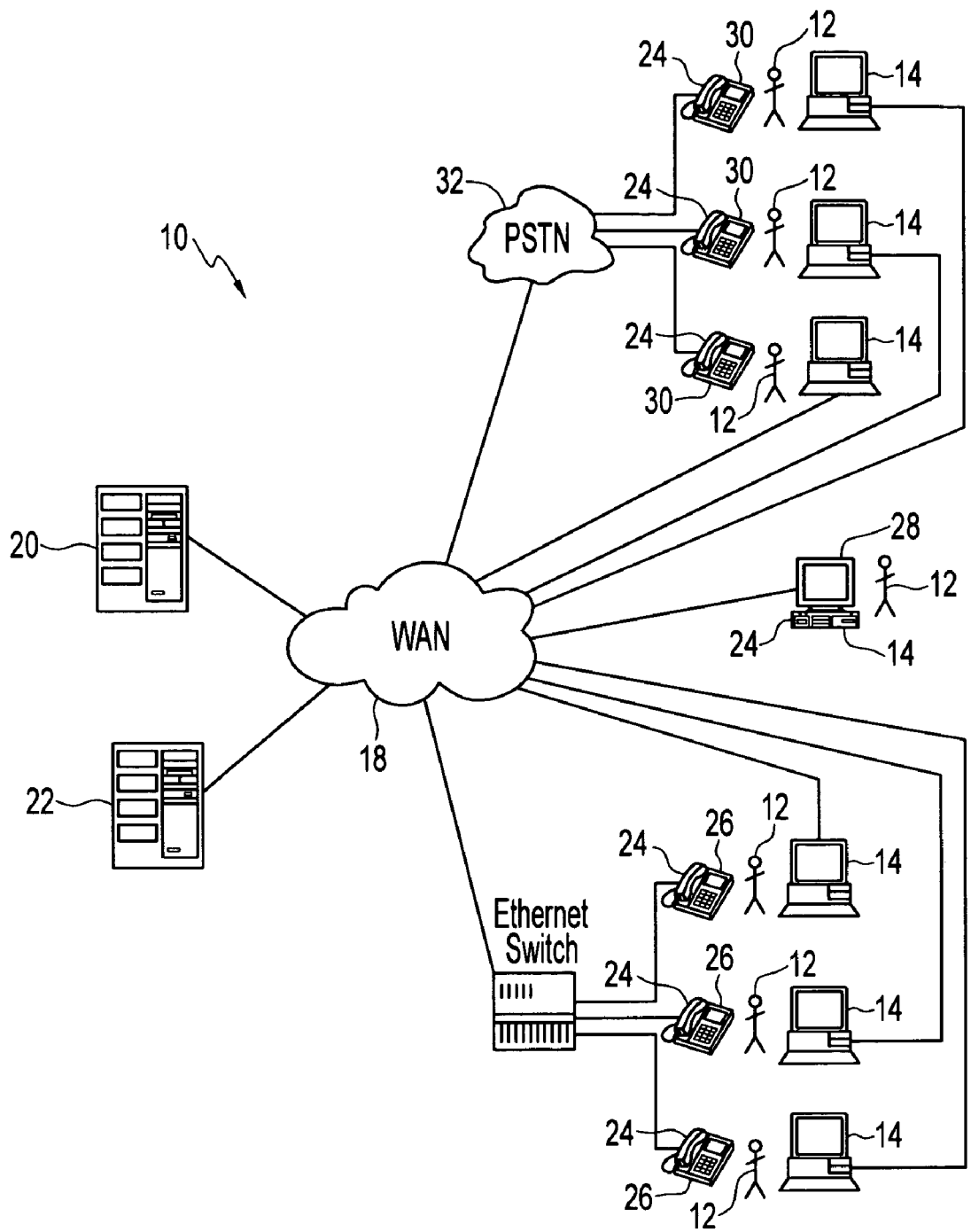
FIG. 2 is a schematic representation of another embodiment of a gaming system in accordance with the present invention.

Referring initially to FIGS. 1 and 2, the present invention is directed to a system 10 for providing simultaneous context based audio interaction among a plurality of participants or players 12 in a network based gaming environment. Audio interactions include the transfer of audible communications or signals among the participants including voice communications. In one embodiment as illustrated in FIG. 1, the system 10 includes a single centralized game server 14 in communication with the plurality of game participants 12. In another embodiment as illustrated in FIG. 2, the system includes a plurality of distributed game servers 14, wherein each game server 12 is associated with at least one game participant 12. Game server 14 can be any type of server known and available in the art and capable of hosting a dynamic, multi-user, network based gaming environment and maintaining a game state profile for each game participant 12. When the system 10 includes a plurality of game servers 14, each game server maintains a game state profile for each game participant 12. This information can be stored in one or more databases 16 in communication with the game server 14.

Any protocol suitable for implementing a Voice over Internet Protocol (VoIP) conference can be used in the present invention. Preferably, the protocol is a Session Initiation Protocol (SIP), which has emerged as the frontrunner in VoIP applications. Therefore, in one embodiment, game server 14 includes an SIP stack. SIP is a HyperText Transfer Protocol (HTTP)-like protocol that is useful to establish sessions among groups of users or locations. SIP provides for a variety of functionality among the users, for example permitting a user to subscribe to interesting events that are hosted at another user's location and to receive notifications whenever those events occur. Additional details about SIP can be found in Internet Architecture Board (IAB) Request For Proposal number 3261(RFC 3261).

Game server 14 is in communication with the participants through one or more local or wide area networks 18, for example the internet or World Wide Web. Other suitable networks include secure area networks, private networks, virtual private networks and combinations thereof. In one embodiment, game server 14 communicates with the game participants 12 using SIP.

The system also includes one or more audio conference servers 20 in communication with the game server 14. In one embodiment, game server 14 communicates with the audio conference server 20 using SIP. The audio conference server 20 can be any type or server capable of hosting a VoIP based audio conference between two or more of the game participants 12. Suitable servers are available and known in the art. The conference server 20 and game server 14 are also networked together to provide for communication. In one embodiment, the conference server 20 and game server 14 are in communication through the wide area network 18. This can be the same network across which the game server 14 communicates with the game participants 12 or can be a separate network. Other suitable networks include local area networks, secure area networks, private networks, virtual private networks and combinations thereof.

The system 10 also includes at least one audio mixer 22 in communication with the audio server 20 capable of providing the audio mixing for the audio conferences. In one embodiment, the audio mixer 22 and audio server 20 are in communication through the wide area network 18. This can be the same network across which the game server 14 communicates with the game participants 12 or can be a separate network. Other suitable networks include local area networks, secure area networks, private networks, virtual private networks and combinations thereof. In another embodiment, audio mixer 22 can be centrally located at the audio server 20 including being integrated into the audio conference server 20.

In order to participate in an audio conference, each participant 12 has an audio communication device 24 capable of sending and receiving audio communications such as voice communications. Suitable audio communication devices 24 include an internet protocol phone 26, a software based phone 28 and conventional telephone equipment 30 using an SIP gateway interface through a public switched telephone network (PSTN) 32. The audio mixer 22 is in communication with each audio communication device 24. In one embodiment, the audio mixer 22 and communication devices 24 are in communication through the wide area network 18. This can be the same network across which the game server 14 communicates with the game participants 12 or can be a separate network. Other suitable networks include local area networks, secure area networks, private networks, virtual private networks and combinations thereof. In an alternative embodiment, a plurality of distributed, for example geographically distributed, audio conference servers 20 and audio mixers 22 can be used to improve audio conference performance. In this embodiment, each audio mixer 22 and audio server 20 is in communication with at least one of the audio conference participants 12. Suitable distributed arrangements of audio conference servers 20 and mixers 22 are described in U.S. patent application Ser. No. 10/697,834, titled "System and Apparatus for Geographically Distributed VoIP Service with Enhanced QoS", which is incorporated herein by reference in its entirety.

Figure 3:
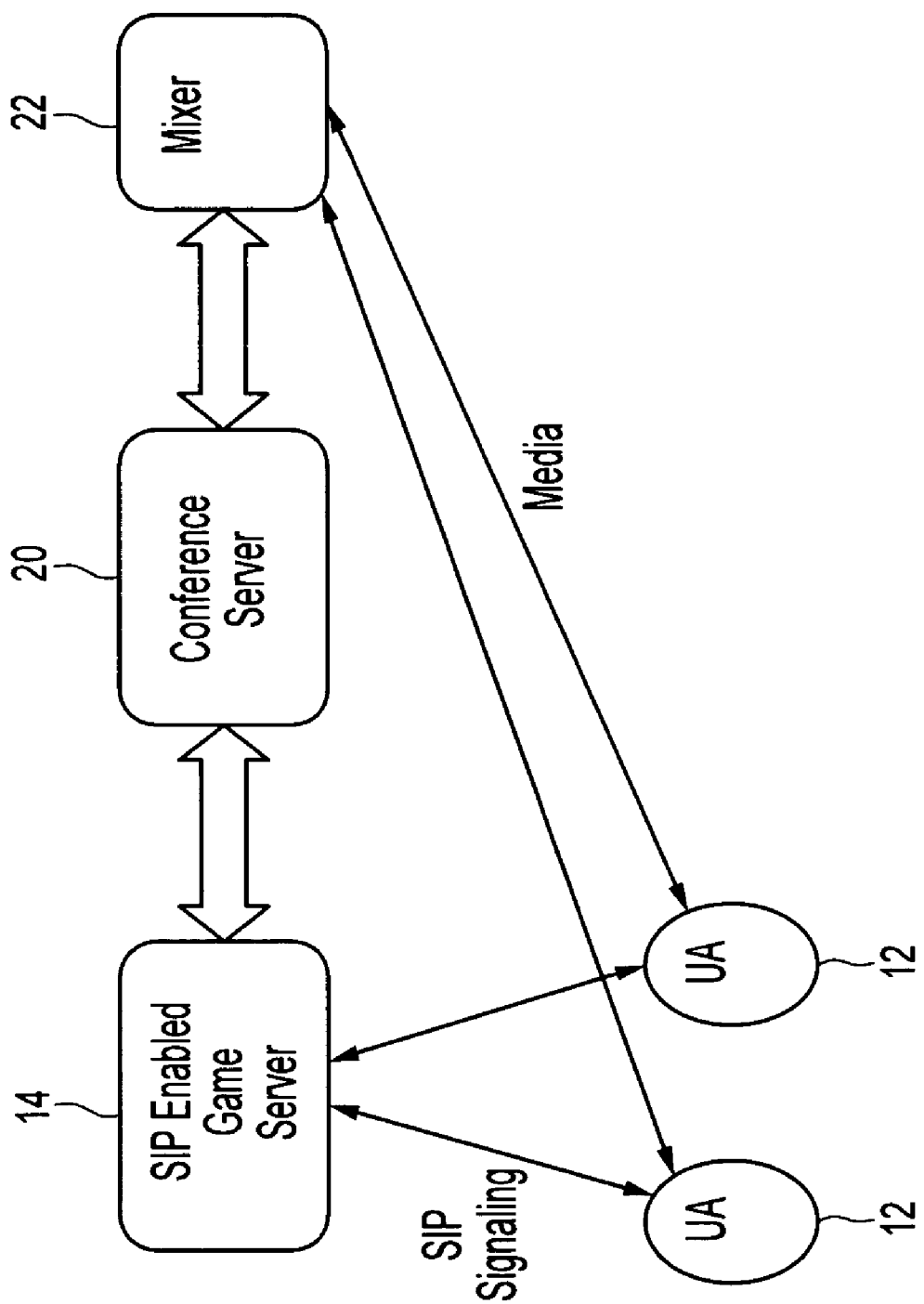
FIG. 3 is a schematic representation illustrating the communications among the components of the gaming system.

Audio conferences among two or more participants are established by the audio conference server 20 in response to instructions from the game server 14. The audio mixer 22 controls and delivers the audio signal directly to each audio communication device 24 as instructed by the audio conference server 20. The game server 14 initiates and controls the audio conferences based upon the game state profiles of the game participants. For example, the game server 14 uses the game state profiles to determine which participants 12 are to be included in a given audio conference. The participants 12 do not initiate or control the audio conferences. Therefore, as illustrated in FIG. 3, the game participants 12 communicate with the game server 14 and the audio mixer 22, but do not directly send instructions or queries to the conference server 20.

For a given audio conference, the game server 14 determines or selects, based upon the current game state profiles for each game participant 12, a group of game participants 12. Alternatively, the game server 14 manages a plurality of simultaneous and independent audio conferences, each audio communication containing a group of two or more game participants 12. The number of participants in the group can be from one, for example for hearing echoed sound, up to the entire current number of game participants 12. The communication can be two-way or one-way, for example when eavesdropping. Each game participant 12 can simultaneously be a member of two or more groups and participate in two or more independent audio conferences. In general game participants 12 in a given group have one or more shared game contexts. As used herein, shared context defines a set of parameters or attributes within the game state profiles that allow audio communication between two or more participants.

Figure 4:
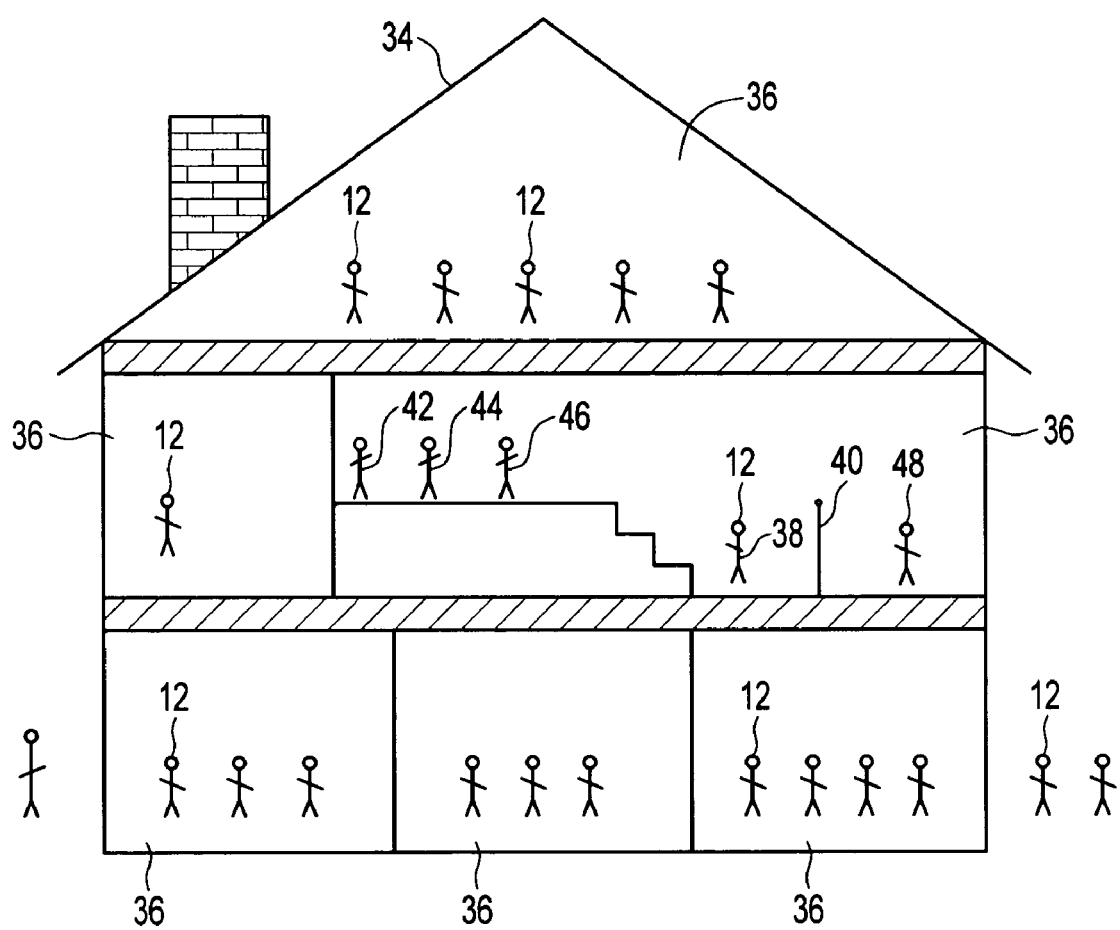
FIG. 4 is a schematic representation of a room based environment for use in the gaming system of the present invention.

For example as illustrated in FIG. 4, the shared context can be physical proximity. As illustrated, the game environment includes a physical structure 34, for example a house, having interior and exterior regions and a plurality of rooms 36. The audio conference groups would include game participants 12 located in the same region or room. This could be referred to as room-based conferencing or view-based conferencing. For example, players in the same game room can talk to each other (talking trash, strategizing).

As game participants 12 move between rooms or regions, the game server 14 monitors the changes to the game state profiles and dynamically switches game participants 12 between the appropriate groups. The game server 14 can also eliminate groups or initiate new groups depending upon the game state profiles. As game participants 12 change rooms, the audio changes seamlessly in conjunction with the visual state of the game. Changes are made without additional input from the game participants 12.

Other shared contexts include possession of a communication medium, for example a two-way radio, membership in a group, for example belonging to the same airplane squadron or army, telepathic connections, and shared language. Therefore, the present invention adds game specific context to communications among the participants, enhancing the gaming experience.

In another embodiment of the present invention, the gaming experience is further enhanced by the use of sophisticated audio mixing of the audio signals delivered to each game participant. In general, each game participant 12 receives an audio signal that simply contains the cumulative input from all the other game participants 22 in the group for a particular audio conference. In accordance with the present invention, however, the received audio is not simply a straight combination of audio signals, but is game-state dependent. For example, in a soccer game, players hear the voices of all of the other players on the soccer field. That is the group contains all of the game participants located on the soccer field. However, the loudness of the voices from various players depends upon factors like distance from the listener. Thus the forward hears louder voices from other forwards and midfielders and the other team's defenders than from its own defenders. This provides for a greater life-like simulated experience and integrates well with the game.

As illustrated in FIG. 4, a first participant 38 receives an audio signal that contains the $\Sigma$ (audio signals or voices from all other participants 12 in the same room 36). In order to add additional context, a feature vector, X, is defined between the first participant and every other participant in the room. This feature vector is determined by the game server 14 based upon game context features including, but not limited to distance from the first participant, communication medium (air, water, telephone, etc.), transmission frequency, transmission amplitude, tone of the speaker's voice, room acoustics and room layout, for example the existence of partial barriers 40. The game server 14 sends the feature vector for each game participant 12 to the audio mixer 22 through the audio conference server 20.

A separate feature vector can be provided for each game participant 12, or different feature vectors can be calculated, some that apply to all of the participants in the group and some that are specific to a single participant or a single pair of participants.

Therefore, the audio signal received by the first participant is $\Sigma$ ($X_2$(audio from second participant 42)+$X_3$(audio from third participant 44)+$X_4$(audio from fourth participant 46)+$X_5$(audio from fifth participant 48)). Similar calculations are made for the other group members.

In addition, the feature vector can indicate not only scalar qualities of the audio signal such as distance and loudness but can indicate directional information including left or right, up or down and forward or back. Therefore, based upon the audio signal received by the first participant 38, that participant would be able to tell that in the game environment that both the second and fourth participants 42,46 are to the left and upstairs and that the second participant 42 is farther away than that fourth participant 46. The directional information is particularly well suited for stereo, surround sound, virtual reality or holographic applications. The exact values for the feature vectors can be set to any values suitable to provide the desired game environment effects.

Figure 5:
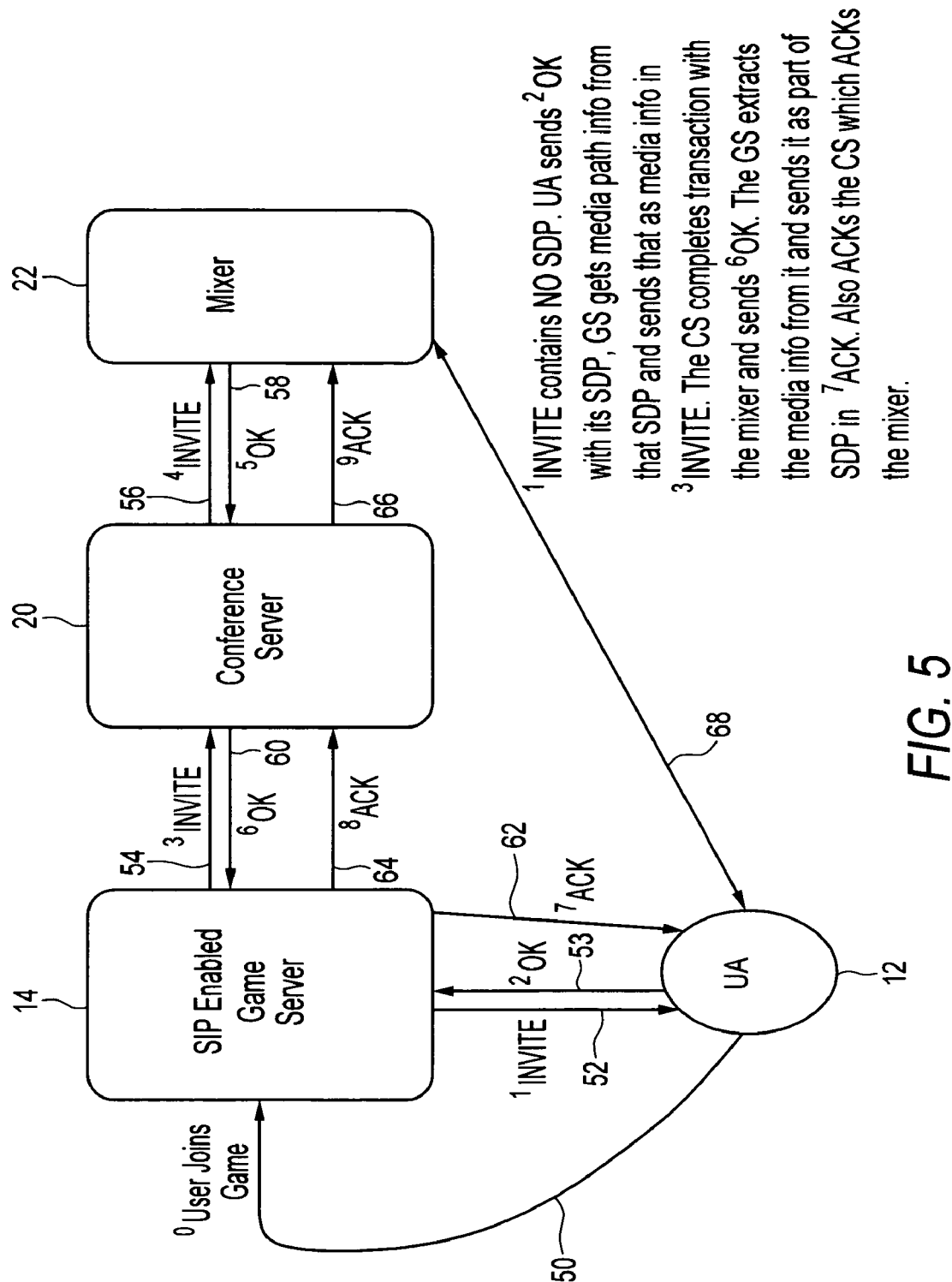
FIG. 5 is a schematic representation illustrating the creation of an audio conference in accordance with the present invention.

In order to provide simultaneous context based audio interaction among the plurality of game participants 12 in a network based gaming environment, a network based game environment containing a plurality of game participants 12 is established. Referring to FIG. 5, in order to join the gaming environment, each game participant 12 contacts 50 the game server 14 and gives an address for its audio communication device 24 to use for audio or voice communication in conjunction with the game. After the game participant 12 has contacted the game server, the game participant 12 can play the game. While the game is being played, the game server, either centralized or distributed, maintains a game state profile for each one of the game participants 12 that have joined.

For a centralized game sever 14 embodiment, the game server 14 acts as a link between all the game participants 12 and maintains the game state profiles for each game participant 12. In the distributed game server 14 embodiment, the maintenance and exchange of game state profile information is done by the each one of the distributed game servers 14. In an embodiment having a game server 14 associated with each participant 12, the participants 12 themselves maintain and exchange the game state information. In this embodiment, whenever any participant 12 performs any action (moves, shoots, leaves, etc.), that participant 12 notifies all other participants 12 about this action, and the other participants update their game state profiles accordingly.

After a game participant 12 has contacted the game server 14 and joined the game, the game server 14 brings the participant into the game and initiates the audio communication device and gaming device identified by the game participant 52, for example by using the SIP "INVITE" command to invite the devices into the game. The participant responds by sending its signal description protocol (SDP) 53, for example by using the SIP "OK" command.

The game server 14 maintains game state profiles for each participant in the game, and as participants 12 join the game or participate in the game, the game server 14, in accordance with the present invention, establishes one or more VoIP based audio conferences among the game participants 12 based upon the game state profiles. Preferably, the game server establishes an SIP based VoIP based audio conference. Establishing the audio conferences includes creating new conferences and modifying or terminating existing conferences.

In one embodiment as illustrated in FIG. 5, the game server 14 obtains the media or audio path information for the game participant 12 from the received SDP. This information is forwarded to the audio conference server 54 which passes it along to the audio mixer 56, both using, for example, the SIP "INVITE" command. The audio mixer responds to the conference server 58 which responds to the game server 60, both using, for example, the SIP "OK" command. These responses contain the SDP for the conference server and audio mixer. The game server extracts the necessary media information from these SDP's and forwards this information to the game participant 62, for example using the SIP "ACK" command. The game server, also using, for example, the SIP "ACK" command, contacts the audio conference server 64 which in turn contacts the audio mixer 66. This establishes and enables the audio path 68 between the game participant 12 and the audio mixer 22 to be used in the VoIP audio conference.

In an embodiment having a plurality of distributed game servers, game servers associated with each game participant maintain sessions directly with the conference server and, depending upon the game state, initiate the establishment and dynamic switching of audio conferences. In this embodiment, the interactions performed by the game servers are done by a client side utility, and the communications with the conference servers come from each one of the participant associated game servers.

When establishing audio conferences, the game server 14 determines at least one group, or a plurality of groups, of game participants possessing a shared context that permits the transmission or receipt of audio communications among game participants in that group. The game server 14 maintains or modifies the participants in each group based upon changes in the game state profiles of those game participants. This includes the addition or removal of participants from the groups and the switching of at least one participant between two distinct groups. The switching of participants between groups is accomplished dynamically and seamlessly by the game server without any disruption in the game or audio conference or without the need for additional input from the participants. In the room-based conferencing example, as soon as a game participant moves to another room, the game server notices the change and switches that participant to an audio conference associated with the new room. In general, the game participants do not do any SIP signaling with the conference server themselves. The game server acts as a back-to-back user agent and maintains their sessions on their behalf, setting up the media path to point to each audio communication device.

Figure 6:
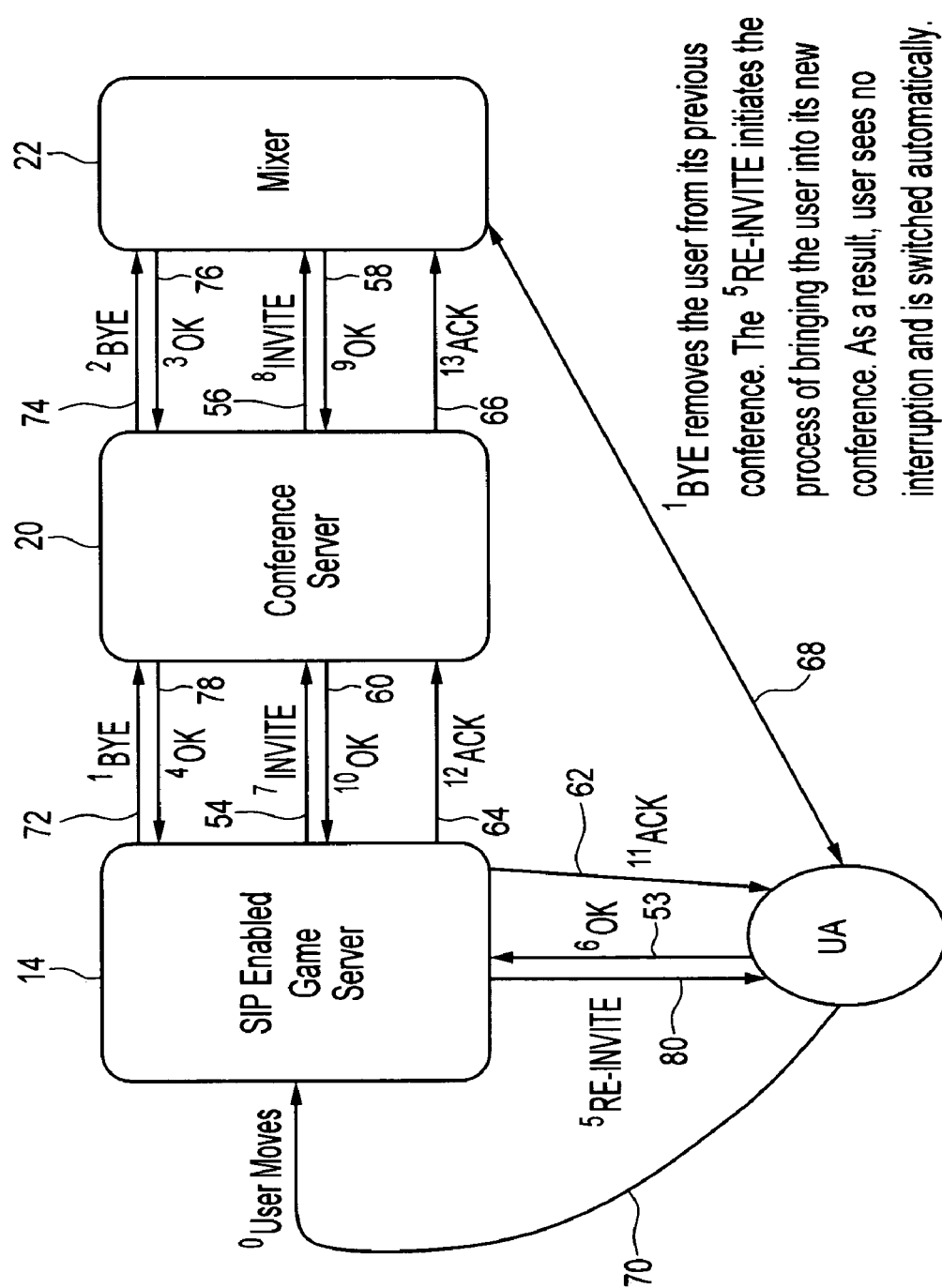
FIG. 6 is a schematic representation illustrating the modification of an audio conference in accordance with the present invention.

Referring to FIG. 6, when a game participant 12 moves or acts within the game environment, this information is communicated to the game server 70. If the actions or motion of the game participant 12 dictate the need to transfer that participant from one conference group to another, the game server 14 updates the media information at both the audio mixer 22 and the game participant 12. The game server 14 initiates the transfer process by removing the game participant from one audio conference, for example by sending an SIP "BYE" command to the conference sever 72 which sends an SIP "BYE" command to the audio mixer 74. The change is acknowledge back to the game server 14, for example by sending an SIP "OK" command to the conference server 76 which sends an SIP "OK" command to the game server 78.

The game server 14 then, using for example an SIP "RE-INVITE" command, obtains the media or audio path information for the game participant 80. This information is forwarded to the audio conference server 54 which passes it along to the audio mixer 56, both using, for example, the SIP "INVITE" command. The audio mixer responds to the conference server 58 which responds to the game server 60, both using, for example, the SIP "OK" command. These responses contain the SDP for the conference server and audio mixer. The game server extracts the necessary media information from these SDP's and forwards this information to the game participant 62, for example using the SIP "ACK" command. The game server, also using, for example, the SIP "ACK" command, contacts the audio conference server 64 which in turn contacts the audio mixer 66. This establishes and enables the audio path 68 between the game participant 12 and the audio mixer 22 to be used in the VoIP audio conference.

In one embodiment, establishing an audio conference includes delivering an audio signal to each audio conference participant that comprises the sum of all received audio signals from all other audio conference participants. Preferably, the game server determines the audio feature vector for each pair of audio conference participants based upon the game state profiles associated with the participants and modifies audio signals transmitted between the pair of audio conference participants in accordance with the audio feature vector. In one embodiment, the game server modifies the audio feature vector in response to changes in the game state profiles of the audio conference participants.

In one embodiment, the feature vectors are transmitted by the game server to the conference server and audio mixer. This can be achieved by the conference server subscribing to such information at the game server, using for example an SIP "SUBSCRIBE" command, and the gaming server sending messages to the conference server containing such feature vectors for the players, using for example an SIP "NOTIFY" command.

The present invention is also directed to a computer readable medium containing a computer executable code that when read by a computer causes the computer to perform a method for providing simultaneous context based audio interaction among a plurality of participants in a network based gaming environment. In one embodiment, this code is maintained, read and executed by the game server.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for providing simultaneous context based audio interaction among a plurality of participants in a network based gaming environment, the method comprising:

using a single centralized game server configured to host a single instance of a dynamic, multi-user, network based game to establish a network based game environment containing identifications for a plurality of game participants, the game comprising integrated voice over internet protocol communication capabilities;

maintaining a game state profile for each one of the game participant identifications at the game server, each game state profile comprising game specific context for a given game participant identification;

using solely the game server to send instructions to a conference server separate from the game server to establish a plurality of simultaneous and independent voice over internet protocol based audio conferences within the network based game environment, all of the audio conferences contained within the single network based game instance, each audio conference comprising a group of participant identifications, each group comprising a plurality of participant identifications having a shared game context within the game state profiles comprising parameters or attributes that permit audio communication among the game participants associated with those participant identifications and audio paths between a plurality of geographically distributed audio mixers and communication devices associated with each game participant identification in that group;

using the audio paths for the permitted audio communications among game participants; and using the game server to switch participants among the audio conferences seamlessly and dynamically during the single network based game instance and non-disruptively to the single network based game instance and any of the audio conferences;

wherein the participant identifications in each group are selected by the game server based solely upon the maintained game state profiles the conference server used to establish audio paths between the plurality of geographically distributed audio mixers and communication devices associated with each game participant in one of the audio conferences solely in response to the instructions sent from the game server, each audio mixer separate from the communication devices associated with each game participant, game server and conference server.

2. The method of claim 1, wherein the game specific context comprises a common. communication medium, membership in a group, telepathic connections or a shared language.

3. The method of claim 1, wherein the step of maintaining a game state profile comprises maintaining a game state profile for each participant in each one of a plurality of distributed game servers associated with each participant.

4. The method of claim 1, wherein at least one participant identification is simultaneously contained in at least two identified groups of participant identifications and the associated game participant participates simultaneously in at least two of the independent audio conferences.

5. The method of claim 1, further comprising modifying one of the groups of participants based upon changes in the game state profiles of game participants in the group.

6. The method of claim 5, wherein the step of modifying the group of participants comprises removing participants or adding participants from the audio conference associated with that group of participants.

7. The method of claim 1, wherein each audio conference comprises a session initiation protocol based audio conference and the step of using the game server to switch participants among the audio conferences further comprises using session initiation protocol signaling messages to switch participants among the audio conferences.

8. The method of claim 7, wherein the step of using session initiation protocol signaling messages to switch participants among the audio conferences further comprises:
obtaining a signal description protocol at the game server from each game participant identification using session initiation protocol signaling messages; and
obtaining a signal description protocol at the game server for the conference server and each audio mixer using session initiation protocol signaling messages.

9. The method of claim 1, wherein the game server comprises a back-to-back user agent and maintains audio conferences on behalf of the game participants, instructing the conference server to set up each media path to point to the communication device of each game participant.

10. The method of claim 1, further comprising identifying a feature vector between each pair of participants in each audio conference, each feature vector comprising direction and distance information between a given pair of participants; and
using the feature vectors to modify audio signals exchanged between pairs of participants within a given audio conference;
wherein the audio feature vector comprises information about distance, direction, communication medium, transmission frequency or transmission amplitude.

11. The method of claim 10, further comprising modifying the audio feature vector in response to changes in the game state profiles of the audio conference participants.

12. The method of claim 1, in the game comprises a sports themed game.

13. The method of claim 1, wherein at least one participant identification is simultaneously contained in at least two identified groups of participant identifications and the associated game participant participates simultaneously in at least two of the independent audio conferences based on single shared contexts within the game state profile that comprises attributes separate from physical proximity among game participants within the game environment.

14. The method of claim 1, wherein the shared game context comprises attributes separate from physical proximity among game participants within the game environment.

15. The method of claim 1, further comprising:
obtaining audio path information for each game participant identification from its signal description protocol and communicating the obtained audio path information to the conference server and each audio mixer; and
obtaining audio path information for the conference server and each audio mixer from its signal description protocol and communication the obtain audio path information to the game participant identifications; and
using the communicated audio path information to establish the audio paths between the plurality of geographically distributed audio mixers and communication devices associated with each game participant identification in each group.

16. A non-transitory computer readable medium containing a computer executable code that when read by a computer causes the computer to perform a method for providing simultaneous context based audio interaction among a plurality of participants in a network based gaming environment, the method comprising:
using a single centralized game server configured to host a single instance of a dynamic, multi-user, network based game to establish a network based game environment containing identifications for a plurality of game participants, the game comprising integrated voice over internet protocol communication capabilities;
maintaining a game state profile for each one of the game participant identifications at the game server, each game state profile comprising game specific context for a given game participant identification;
using solely the game server to send instructions to a conference server separate from the game server to establish a plurality of simultaneous and independent voice over internet protocol based audio conferences within the network based game environment, all of the audio conferences contained within the single network based game instance, each audio conference comprising a group of participant identifications, each group comprising a plurality of participant identifications having a shared game context within the game state profiles comprising parameters or attributes that permit audio communication among the game participants associated with those participant identifications and audio paths between a plurality of geographically distributed audio mixers and communication devices associated with each game participant identification in that group;
using the audio paths for the permitted audio communications among game participants; and
using the game server to switch participants among the audio conferences seamlessly and dynamically during the single network based game instance and non-disruptively to the single network based game instance and any of the audio conferences;
wherein the participant identifications in each group are selected by the game server based solely upon the maintained game state profiles the conference server used to establish audio paths between the plurality of geographically distributed audio mixers and communication devices associated with each game participant in one of the audio conferences solely in response to the instructions sent from the game server, each audio mixer separate from the communication devices associated with the game participants, game server and conference server, 17. The non-transitory computer readable medium of clam 16, wherein the game specific context comprises a common communication medium, membership in a group, telepathic connections or a shared language.

18. The computer readable medium of claim 16, wherein the step of maintaining a game state profile comprises maintaining a game state profile for each participant in each one of a plurality of distributed game servers associated with each participant.

19. The non-transitory computer readable medium of claim 16, wherein at least one participant identification is simultaneously contained in at least two identified groups of participant identifications and the associated game participant participates simultaneously in at least two of the independent audio conferences.

20. The non-transitory computer readable medium of claim 16, further comprising modifying one of the groups of participants based upon changes in the game state profiles of game participants in the group.

21. The non-transitory computer readable medium of claim 20, wherein the step of modifying the group of participants comprises removing participants or adding participants from the audio conference associated with that group of participants.

22. The non-transitory computer readable medium of claim 16, wherein each audio conference comprises a session initiation protocol based audio conference and the step of using the game server to switch participants among the audio conferences further comprises using session initiation protocol signaling messages to switch participants among the audio conferences.

23. The non-transitory computer readable medium of claim 16, wherein the game server comprises a back-to-back user agent and maintains audio conferences on behalf of the game participants, instructing the conference server to set up each media path to point to the communication device of each game participant.

24. The non-transitory computer readable medium of claim 16, further comprising identifying a feature vector between each pair of participants in each audio conference, each feature vector comprising direction and distance information between a given pair of participants; and
   using the feature vectors to modify audio signals exchanged between pairs of participants within a given audio conference;
   wherein the audio feature vector comprises information about distance, direction, communication medium, transmission frequency or transmission amplitude.

25. The non-transitory computer readable medium of claim 24, further comprising modifying the audio feature vector in response to changes in the game state profiles of the audio conference participants.

* * * * *